D. MILLER.
COMBINATION SAD IRON HEATER AND COOKING UTENSIL.
APPLICATION FILED MAY 26, 1915.

1,154,714.

Patented Sept. 28, 1915.

Witness
Alice L. Boorman

Inventor
Dicey Miller
By Bradford & Doolittle
Attorneys

UNITED STATES PATENT OFFICE.

DICEY MILLER, OF BENNINGTON, VERMONT.

COMBINATION SAD-IRON HEATER AND COOKING UTENSIL.

1,154,714.   Specification of Letters Patent.   Patented Sept. 28, 1915.

Application filed May 26, 1915. Serial No. 30,642.

*To all whom it may concern:*

Be it known that I, DICEY MILLER, a citizen of the United States, residing at Bennington, Bennington county, and State of Vermont, have invented and discovered certain new and useful Improvements in Combination of Sad-Iron Heater and Cooking Utensil, of which the following is a specification.

The present invention relates to devices for heating sad irons and has for its purpose to provide such an article adapted for holding one or more irons to be heated and, at the same time, to permit of the use of the flame, or burner, for cooking purposes.

A further object of the invention is to provide a combination of sad iron heater and cooking utensil associated in a manner permitting of their use simultaneously, or one without the other, and wherein the same are separably connected to the end that they may be each used independently.

The invention is shown by way of illustration in the accompanying drawings, wherein—

Figure 1:
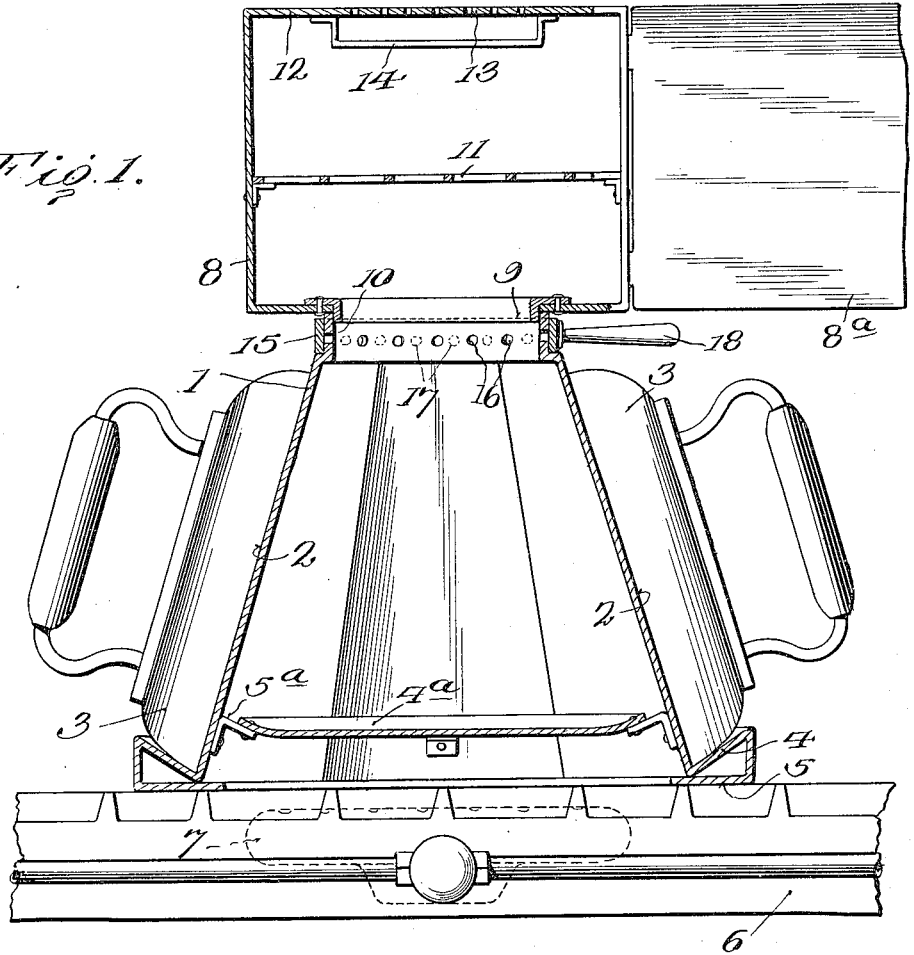
Figure 2:
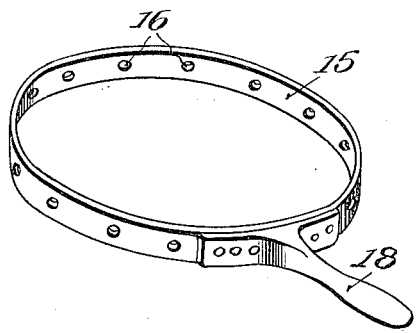

Figure 1 is a central vertical sectional view of the same, and Fig. 2 is a detail perspective view of the draft regulator employed.

Referring to the construction in further detail, the device consists of a body 1 constructed of sheet metal and of pyramidal design to provide a plurality of heating surfaces 2 for the sad irons 3 that rest thereon in the manner shown. The base of the frame body 1 is designed to form an annular and inwardly inclined ledge 4 for supporting said irons, and the base or ring 5 that rests on the stove 6 immediately surrounding the gas burner 7, or lid opening when the other type of stove is used. A disk plate 4ª is secured to the body 1 immediately adjacent the base 5 by a series of angle members 5ª, and serves to direct the flame from the center and against the several heating surfaces 2.

A cooking utensil 8 of any suitable kind, having a door 8ª, is mounted on the body 1 and adapted for ordinary cooking purposes while the irons are being heated, thereby utilizing the same products of combustion for two distinct purposes and simultaneously.

The cooking utensil 8 is constructed of sheet metal and has an open bottom surrounded by a flanged ring 9 that closely fits within the neck 10 of the body 1, and thus the interiors of said body 1 and the cooking utensils are in communication to allow of the free passage of the heated gases. A shelf 11 is mounted within the cooking utensil and is designed as a grate; and the top wall 12 of said utensil is formed with a number of perforations 13 to allow the escape of the products of combustion. Said perforated top 12 may be utilized for supporting boilers or frying pans, and, to retard the heated gases within the cooking utensil, a baffle plate 14 is secured to the wall 12 and immediately in front of the openings 13. The cooking utensil may be readily disconnected from the sad iron heater and used alone, and, in like manner, the sad iron heater may be used with the cooking utensil removed.

It is proposed to regulate the draft passing from the sad iron heater into the cooking utensil, and for this purpose a band or ring 15 is mounted on the neck 10 of the body 1 and has a plurality of apertures 16 adapted to variably register with corresponding openings 17 formed in said neck; and a manipulating handle 18 is secured to the ring 15.

It is obvious that those skilled in the art may vary the details of construction and arrangement of parts without departing from the spirit of the invention, and therefore I do not wish to be limited to such features except as may be required by the claims.

Having thus fully described my said invention, what I claim as new and desire to secure by Letters Patent, is:

1. A device of the character described comprising a body constructed of sheet metal and designed to form an annular and inclined support for sad irons, and an annular horizontal supporting base, the sides of said body providing sad iron rests and heating surfaces therefor, and a deflector plate secured to the body adjacent the base thereof for directing the heated gases against said heating surfaces, substantially as set forth.

2. A device of the character described comprising a body of pyramidal design constructed of sheet metal and having an integral outwardly and upwardly turned portion forming an annular support for sad irons said annular support having an integral downwardly and inturned portion forming a supporting base for the body, the sides of said body providing sad iron rests and heating surfaces therefor and the upper end of said body being formed with an open neck, a deflector plate secured to the body adjacent the base for directing the heated gases against said heating surfaces, a cooking utensil detachably mounted on the body at the neck thereof to receive the heated gases therefrom, and a draft regulator disposed between said body and the cooking utensil, substantially as set forth.

In witness whereof, I have hereunto set my hand and seal at Bennington, Vermont, this 24th day of May, A. D. nineteen hundred and fifteen.

DICEY MILLER. [L. S.]

Witnesses:
W. B. SHELDON,
GEO. A. MATHERS.